May 15, 1962 D. E. STEER ET AL 3,034,558
SIDE WALL VALVES
Filed April 21, 1959 5 Sheets-Sheet 1

INVENTORS
DONALD E. STEER
JOSEPH W. SMITH
BY
*Kenyon & Kenyon*
ATTORNEYS

May 15, 1962 D. E. STEER ET AL 3,034,558
SIDE WALL VALVES
Filed April 21, 1959 5 Sheets-Sheet 2
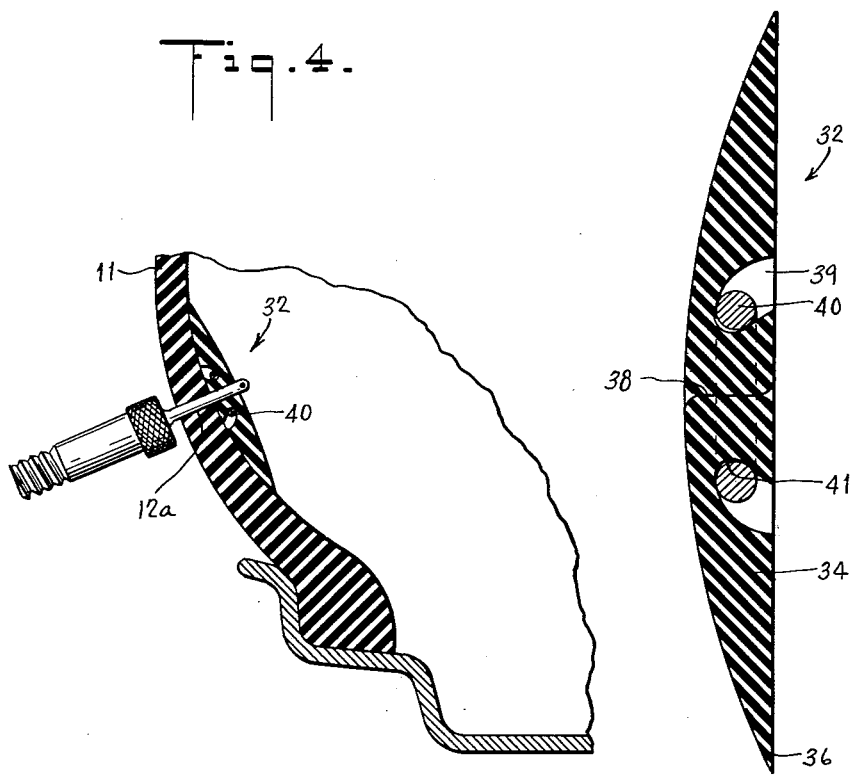
INVENTORS
DONALD E. STEER
JOSEPH W. SMITH
BY
ATTORNEYS

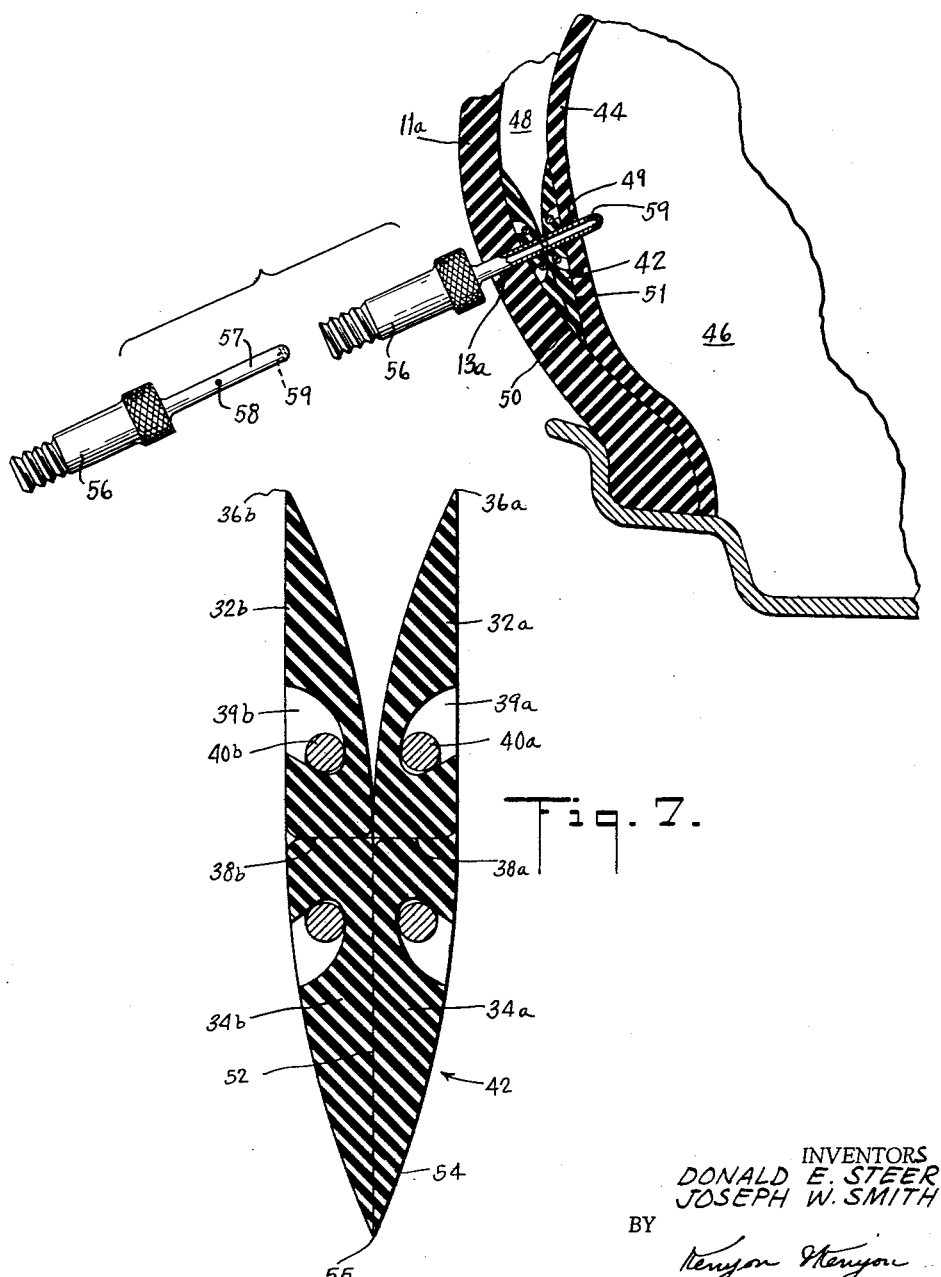

May 15, 1962  D. E. STEER ET AL  3,034,558
SIDE WALL VALVES
Filed April 21, 1959  5 Sheets-Sheet 4
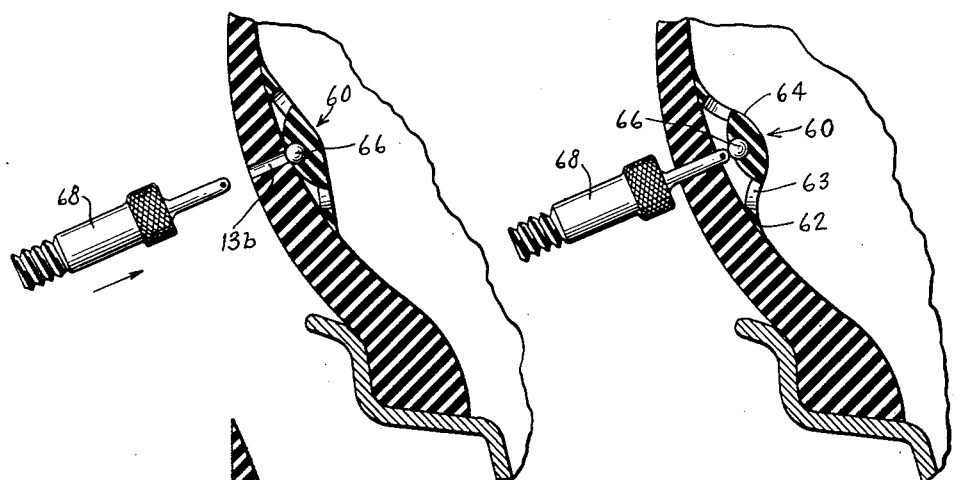
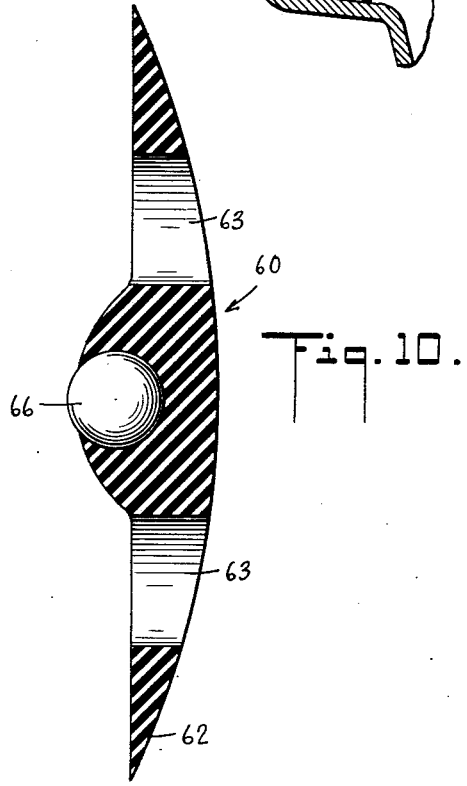
INVENTORS
DONALD E. STEER
JOSEPH W. SMITH
BY
*Kenyon & Kenyon*
ATTORNEYS May 15, 1962 D. E. STEER ET AL 3,034,558
SIDE WALL VALVES
Filed April 21, 1959 5 Sheets-Sheet 5
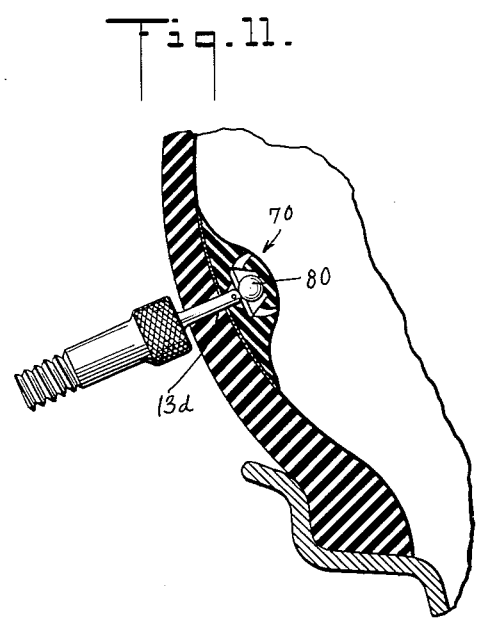
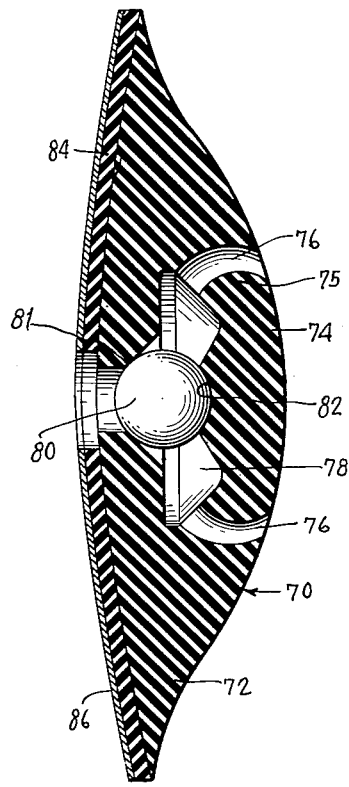
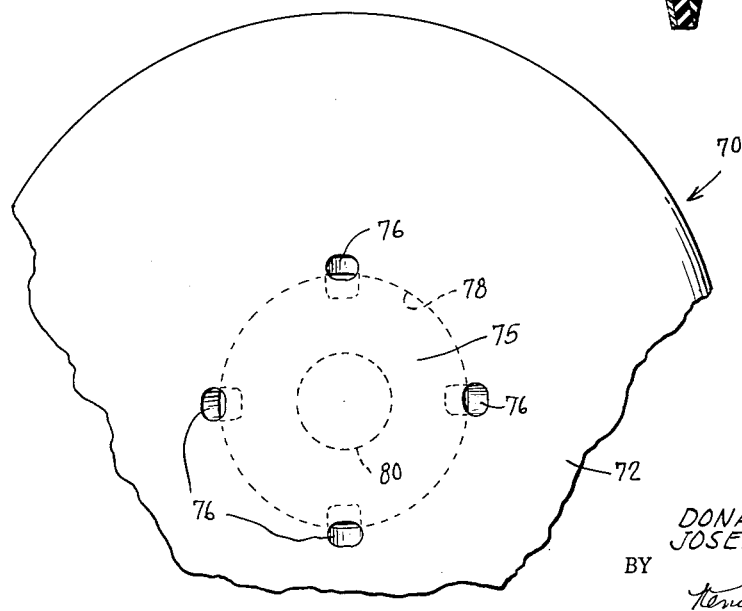
INVENTORS
DONALD E. STEER
JOSEPH W. SMITH
BY
*Kenyon & Kenyon*
ATTORNEYS United States Patent Office 3,034,558
Patented May 15, 1962

3,034,558
SIDE WALL VALVES
Donald E. Steer, Stratford, and Joseph W. Smith, Easton, Conn., assignors to National Distillers and Chemical Corporation, a corporation of Virginia
Filed Apr. 21, 1959, Ser. No. 807,853
5 Claims. (Cl. 152—429)

This invention relates to side wall valves, for use with tubeless automobile tires, of relatively simple construction which can be readily attached to the interior surface of the tire casing.

It is a primary object of the invention to provide a construction of this type usable with standard tubeless automobile tires wherein the valve assembly is secured to the interior surface of the casing with only a needle valve opening through the casing to provide access for introducing air into the tire or for permitting escape of air therefrom when desired.

It is a further object to provide a valve construction for this use which has a low mass which extends for a minimum distance into the interior of the tire and away from the casing.

It is a further object to provide a tire valve of this type which is relatively cheap to construct and apply and which will provide long life and uniform operation.

It is a further object to provide a composite valve suitable for use with a tire having inner and outer chambers with air introduced directly into both chambers and equalized therebetween as the tire is being inflated.

The above and other objects will appear more fully from the following description when considered in connection with the drawings wherein:

FIG. 4 is a transverse sectional view of a modified form of a valve assembly construction in accordance with the present invention, as applied to a pneumatic tire;

FIG. 5 is an enlarged sectional view thereof;

FIG. 6 is a fragmentary transverse sectional view through an automobile tire employed with a special form of valve assembly adaptable to dual chamber tires, the view illustrating the inflator needle out of and in inflating position;

FIG. 7 is an enlarged transverse sectional view of the valve assembly of FIG. 6;

FIG. 8 is a transverse sectional view, illustrating a further modification of the invention, utilizing a ball for sealing directly against the inner surface of the side wall of the tire;

FIG. 9 illustrates the construction of FIG. 8 with the inflator needle in inflating position;

FIG. 10 is an enlarged sectional view showing the valve construction of FIGS. 8 and 9 before being assembled in the tire;

FIG. 11 is a fragmentary transverse sectional view through the side wall of a tire, illustrating a further modification of the invention, with the inflator needle in inflating position;

FIG. 12 is an enlarged sectional view of the valve assembly shown in FIG. 11; and FIG. 13 is a face view of the valve assembly looking toward the left as the valve is illustrated in FIG. 12.

Figure 1:
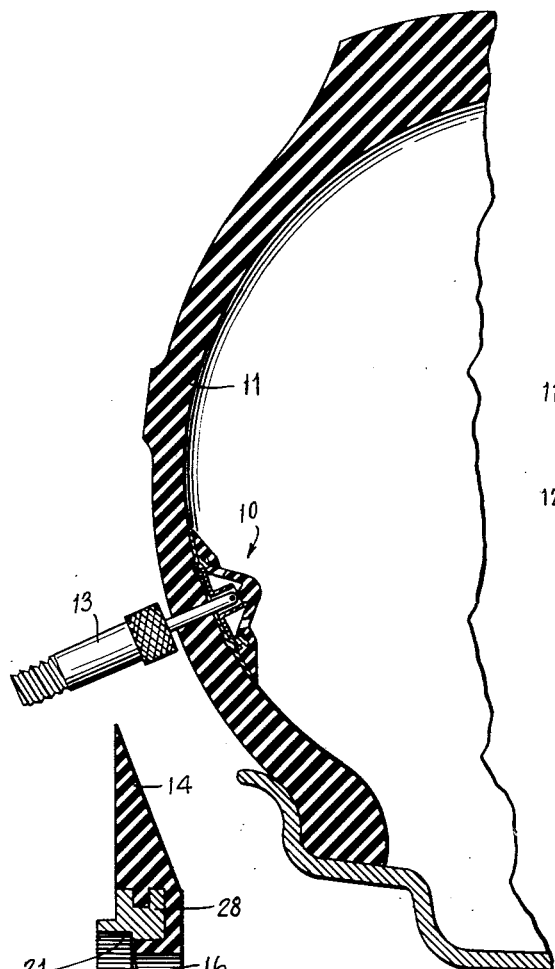
FIG. 1 is a fragmentary transverse sectional view through an automobile tire illustrating one embodiment of the invention, showing the inflator needle in position.
Figure 2:
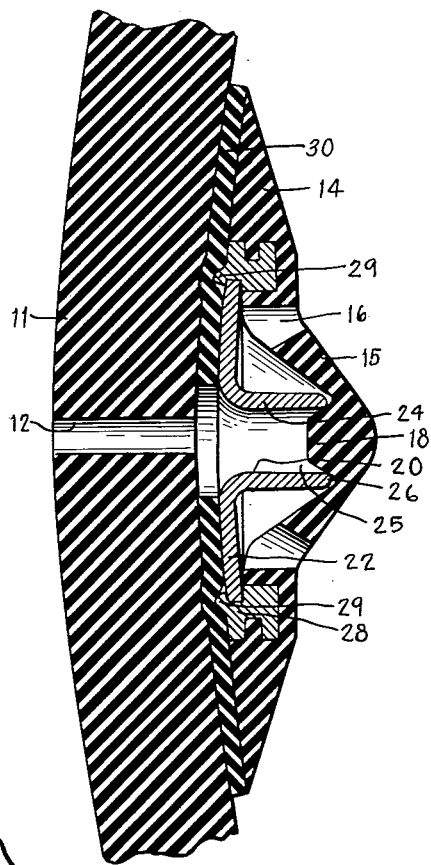
FIG. 2 is an enlarged sectional view thereof, showing the valve assembly applied to the inner surface of a pneumatic tire side wall.
Figure 3:
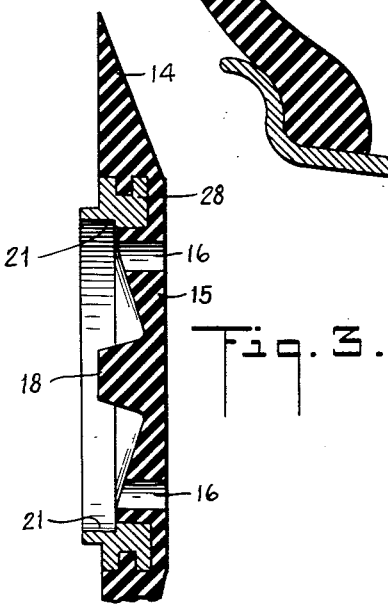
FIG. 3 illustrates the valve assembly of FIGS. 1 and 2 at an intermediate point in its construction.

Referring now to the details of the drawing the form of construction shown in FIGS. 1 to 3 includes a valve assembly 10 secured to the side wall 11 of an automobile tire. The side wall is provided with a small opening 12 through which a needle valve of an inflator 13 can be inserted for inflating or deflating the tire. Otherwise the casing is unchanged by the valve mechanism, that is, there are no exterior projections from the valve mechanism through the side fall of the exterior thereof.

In this form of the invention the valve assembly, the body of which is formed of molded rubber-like material, such as natural or synthetic rubber, includes a circular or oval outer base ring 14 constituting the attachment peripheral portion of the valve. The intermediate portion includes the diaphragm 15 provided with a plurality of openings 16, for example, four such openings, distributed symmetrically about the contour of the diaphragm. The central portion of the diaphragm is formed as an enlarged sealing member 18 movable to or from sealing position when contacted by the inflator needle valve.

The fixed member of the valve seal is provided in the form of an eyelet 20 formed with a flat securing disk portion 22 and an upstanding circular projection 24, providing a central radial opening 25 and sealing edges 26 to be contacted by the sealing member 18. The eyelet is preferably secured in the assembly by means of an anchoring ring insert 28 encircling the outer edge of the disk portion of the eyelet and flanged thereto as indicated at 29. The insert is preferably formed of metal in order to provide the requisite strength and rigidity thereof. The eyelet may be formed of metal although a rigid plastic eyelet has been found satisfactory. The eyelet and metal insert may be molded into the outer ring 14 in any desired manner which will assure the proper positioning of the eyelet with respect to the sealing member 18 when the valve is attached in place to the interior surface of the side wall. The following assembly procedure is preferred.

The elements of the valve assembly are preferably formed by molding the rubber-like body, including the outer ring 14, diaphragm 15 and sealing member 18 around the insert 28. The position of the diaphragm 15 and sealing member 18 can be substantially in the plane of the outer ring 14 during the molding operation as shown in FIG. 3. The eyelet 20 is then inserted into the pocket 21 in the outer face of the insert and the flange of the insert rolled into place around the outer edge of the base 22 of the eyelet 20 to securely attach the eyelet to the insert. The sealing member 18 will thus be forced away from the plane of the ring 14 when the assembly is completed, with the diaphragm 15 maintained under tension where it seals against the sealing edges 26 of the eyelet. The attachment of the assembled valve to the side wall may be accomplished by any known means, for example, by the use of a bonding gum ply 30 securely bonded to the tire casing and to the outer ring 14 of the molded body of the valve.

The tire will be inflated by inserting the usual needle valve through the opening 12 for a sufficient distance into the interior of the tire to displace the sealing member 18, the needle valve sealing against the side walls of the restricted opening 12 to assure that the air introduced through the valve will pass around the eyelet and through the openings 16 into the interior of the tire. When the tire is to be deflated the needle valve can be opened to the atmosphere at any point exteriorly of the casing to permit the escape of the air from the valve to the atmosphere.

In the modified form of the invention shown in FIGS. 4 and 5, the tire casing is the same as in FIG. 1 but the valve assembly 32 is of the simplest possible type. The valve includes a molded body 34 of flexible material, for example, natural or synthetic rubber, gradually tapering to a thin peripheral edge 36. At the axial center of the body 34 there is provided a transverse opening 38 which may be formed in the body during the molding operation or which may be cut through by means of a needle after the disk is formed. In any event the opening 38 is normally closed. For the purpose of assuring that the opening remain closed except when opened by introduction of the needle valve through the side wall opening 12a there is provided a circular slot 39 in one face of the body spaced a short distance from and surrounding the central opening. The slot is provided to receive a rigid ring 40 applied under tension to the inner pocketed edge 41 of the slot. This can be conveniently accomplished by introducing a split ring of nonresilient metal loosely into the slotted opening 39 and compressing the ring in the pocket 41, to substantially completely encircle the transverse opening 38.

The valve assembly is preferably secured to the inner face of the casing side wall as shown in FIG. 4 wherein one face of the body 34 is vulcanized or cemented to the inner surface of the side wall. It is preferred that the slots 39 be positioned against the interior surface of the side wall as shown to prevent any possible displacement of the ring 40 from the slot. Since the opening 38 is aligned with the side wall opening 12a, air is introduced or discharged from the tire through the use of a needle valve as described above. The rigid ring 40 makes certain that when the needle valve is removed the tire will retain its air under pressure.

It will be noted that in this form of the invention there is a minimum mutilation of the tire casing, that is, only a minute opening sufficient to permit the needle valve to be forced through the opening 12a and through a transverse opening 38 in the valve assembly. There is a minimum mass of material involved, this being important not only because of reduced cost but also to avoid making the tire mass nonsymmetrical.

Referring now to FIGS. 6 and 7, the valve assembly in this form of the invention is provided to supply equal pressures to both chambers of a double walled tire provided with a diaphragm 44. The valve assembly is formed of two assemblies of the type shown in FIGS. 4 and 5. Thus the valve assembly 42 includes two units 32a and 32b formed with the pocketed surface slots 39a and 39b reinforcing rings 40a and 40b with substantially the same molded bodies 34a and 34b as in FIGS. 4 and 5. The two units 32a and 32b are secured together back to back, over substantially one-half of their area, so that the slots for receiving the tensioning rings both open outwardly. The valve assembly 42 is then mounted in the tire by being placed between the tire wall 11a and an inner diaphragm 44, which serves to divide the interior of the tire into an inner chamber 46 and an outer chamber 48. The diaphragm 44 is formed with a transverse opening 49 in line with the needle valve opening 13a in the side wall of the tire.

The diaphragm 44 is preferably of a nonstretchable type with sufficient rigidity to maintain its upstanding position as shown in FIG. 6 except as distorted by exterior forces. It is accordingly desirable to maintain the same pressure in the inner chamber and in the outer chamber in normal use. The composite valve assembly 42 is cemented or otherwise secured to the inner surface of the tire and the outer surface of the diaphragm as indicated at 50 and 51 respectively. The two members constituting this assembly are cemented together over substantially one-half of their area as indicated at 52, the projecting ends of the members 36a and 36b diverging to the feathered edges sealed against the tire and diaphragm respectively. The double thin edge 54 projects into the space between the tire and diaphragm, terminating at the point 55 where the diaphragm is cemented or otherwise secured to the tire. When cemented to each other and to the opposed faces of the tire and diaphragm the openings 38a and 38b of the valve assembly are aligned with one another and with the openings 13a in the tire side wall and the opening 49 in the diaphragm. It will be noted that the reinforcing rings 40a and 40b are locked in position since the pocketed slots into which these rings are applied are closed when the valve is cemented to the tire side wall and diaphragm.

Air is introduced into the two chambers by means of a special needle valve 56 connected with an air supply (not shown) and formed with an inflator needle 57 having two openings, one as indicated at 58 at the side directed toward the outer chamber 48, the other opening into the inner chamber 46 as shown at 59. As compressed air is supplied to the needle valve and is passed into the inner and outer chambers substantially the same pressure develops in both chambers. It is desirable to wait a short period after the air is introduced and with the inflator needle in the position as shown in FIG. 6 to afford a short period for equalization of the pressure between the inner and outer chamber.

The form of invention shown in FIGS. 8, 9 and 10 operate on the same principle, but are constructed to provide a ball seal for contact with the casing to seal the interior of the tire or to be displaced by an inflator needle for introducing or withdrawing air from the tire. The valve molded body 60 is accordingly provided with a peripheral attachment portion 62 connected by diaphragm 63 to the central sealing member 64. The sealing member 64 is provided with a sealing element 66, such as a plated ball bearing, molded into and securely attached to the sealing member 64. In normal use and when the tire is sealed the ball 66 engages directly against the inner end of the needle valve opening 13b to prevent escape of air from the interior of the tire. In order to provide suitable tension on the sealing member 64 the valve 60 is preferably formed initially in the form shown in FIG. 10 and then when the valve is cemented or vulcanized to the interior surface of the side wall of the tire as shown in FIG. 8 the ball is pressed against the end of the passage 13b to assist the interior air pressure in holding the valve sealed. Air is introduced into the tire by inserting the usual inflator needle valve 68 forcibly through the needle valve opening 13b and against the ball 66. The needle valve presses the central portion of the valve to the position shown in FIG. 9 for permitting inflation or deflation of the tire.

Referring now to FIGS. 11-13 there is shown a modification of the valve assembly utilizing a ball seal with a flexible molded valve body for maintaining the ball in sealing position against a sealing surface on the valve, adjacent the needle valve opening in the tire side wall. Thus the valve 70 includes a molded rubber-like main body portion 72 relatively thick at its central portion and tapering to a thin edge at its outer periphery as in the earlier forms of the invention. The valve includes a closure element 74 connected to the main body of the valve by a diaphragm 75. The diaphragm includes a series of transverse openings 76 extending from an inner valve cavity 78 to the interior of the tire. Sealing is accomplished by means of a ball 80, for example a usual plated ball bearing normally positioned to engage a sealing surface 81 near the base of the valve and maintained in sealing position by being mounted in a surface cavity 82 at the inner central under portion of the sealing member 74.

The valve assembly 70 is secured directly against the inner surface of the tire side wall as shown in FIG. 11. This may desirably be accomplished by providing a bonding gum ply 84 applied to the base of the valve, which may be supplied and shipped from the factory covered by a holling cloth disk 86. The disk 86 may be removed immediately prior to application of the valve to the interior surface of the side wall. It will be understood that the central opening 73 of the valve is aligned with the inflator needle opening 13d in the casing so that the needle valve will always contact the ball seal when the inflator needle is inserted for air introduction.

It will be clear from the above description that the present invention provides various forms of relatively flat self-sealing valve assemblies mounted wholly within the tire and requiring no projection without the tire and operable in each case by a needle valve inserted through a very small needle valve opening in the tire. The body of each of the valve assemblies being made essentially of rubber or like material, is adaptable to lie flat against and be bonded to the curved inner surface of the side wall of the tire and will flex with the tire inner surface during use thereof. The mass of the entire valve assembly is very small so that the extra weight involved does not constitute a disadvantage in tires so equipped, even for high speed driving.

The particular constructions here shown, while presently believed to be the best forms of device now known for the intended purpose, are set forth for purposes of illustration only, and not with any intention of limiting the invention, whose scope is set forth in the claims appended hereto.

What is claimed is:

1. A side wall tire valve comprising a valve structure positioned within the interior of a tire and attached to the side wall of said tire, said valve structure including a resilient body for attachment to the inner surface of said side wall, an eyelet having a normally sealed axial air passage extending through said body and directed radially toward said side wall and formed with an air inlet end at one face of said body adjacent said side wall and within said tire and an outlet end at the other face thereof and within the interior of said tire for admitting air to said tire, and sealing means normally sealing said outlet end of said air passage against the passage of air therethrough, said sealing means being displaceable axially with respect to said air passage by a needle inflator passing through said tire.

2. A valve assembly adapted to be positioned on an interior side wall of a tire comprising a resilient body including outer attachment edge portions, a central sealing member and an elastic apertured diaphragm connecting said edge portions and said sealing member, an eyelet supported by said edge portions and formed with a flat base and a radial opening therein terminating in a sealing edge portion, said central sealing member being normally drawn into sealing contact with said sealing edge portion of said eyelet and removable therefrom by an inflator needle passed through a tire and a rigid insert bonded to said body and attached to said eyelet for firmly uniting said eyelet to said body.

3. The valve assembly recited in claim 2 and an attachment ply sheet bonded to the base of said body and extending inwardly past said insert and said eyelet for securely attaching said valve assembly to the inner surface of said side wall.

4. The valve assembly recited in claim 3, said attachment ply sheet being bonded to said insert and eyelet.

5. The method of forming a valve assembly for attachment to the inner surface of the side wall of a tire, comprising molding a resilient body about a pocketed rigid insert, while forming an attachment base and sealing member thereon with said sealing member supported on said base by an apertured flexible and elastic diaphragm, with said insert and body in the same general plane, and inserting an eyelet, provided with a central air passageway and terminal sealing edge, into the pocket of said insert while forcing said sealing member axially away from the plane of said insert and body, and securing said eyelet in said pocket with said sealing member tensioned into sealing engagement with the terminal sealing edge of said eyelet.

References Cited in the file of this patent

UNITED STATES PATENTS

| | | |
|---|---|---|
| 568,362 | MacSpadden | Sept. 29, 1896 |
| 670,725 | Pickett | Mar. 26, 1901 |
| 1,930,040 | Crowley | Oct. 10, 1933 |
| 2,710,623 | Kolos | June 14, 1955 |
| 2,944,580 | Nece | July 12, 1960 |

FOREIGN PATENTS

| | | |
|---|---|---|
| 1,095,437 | France | Dec. 22, 1954 |